June 26, 1928.

O. C. RILEY ET AL

SELF CARBONATING APPARATUS

Filed March 31, 1926

1,674,993

Charles B. Poar
Otis C. Riley
Paul Joel
Inventors

By Lyon & Lyon
Attorneys

Patented June 26, 1928.

1,674,993

UNITED STATES PATENT OFFICE.

OTIS C. RILEY AND PAUL W. JOEL, OF LOS ANGELES, AND CHARLES B. POAR, OF GLENDALE, CALIFORNIA.

SELF-CARBONATING APPARATUS.

Application filed March 31, 1926. Serial No. 98,943.

This invention relates to self carbonating apparatus and is more particularly directed to a carbonating apparatus or means adapted to carbonate water for use in connection with syrups, such as root beer or the like.

An object of this invention is to provide a self carbonating apparatus which is compact in form and easily portable and which is adapted to be employed in connection with the sale and distribution of root beer or like flavors in barrels.

Another object of this invention is to provide a self carbonating apparatus in which means are provided for percolating water downwardly against an upwardly rising stream of carbon dioxide.

Another object of this invention is to provide means for breaking up an inflow of carbon dioxide into minute gas particles as the same passes into the water.

Another object of this invention is to provide a float valve mechanism adapted to regulate and control the admission of water into the carbonating apparatus.

Other objects and advantages of this invention will be apparent from the following detailed description of a preferred embodiment thereof as illustrated in the accompanying drawings, in which drawings.

Figure 1:
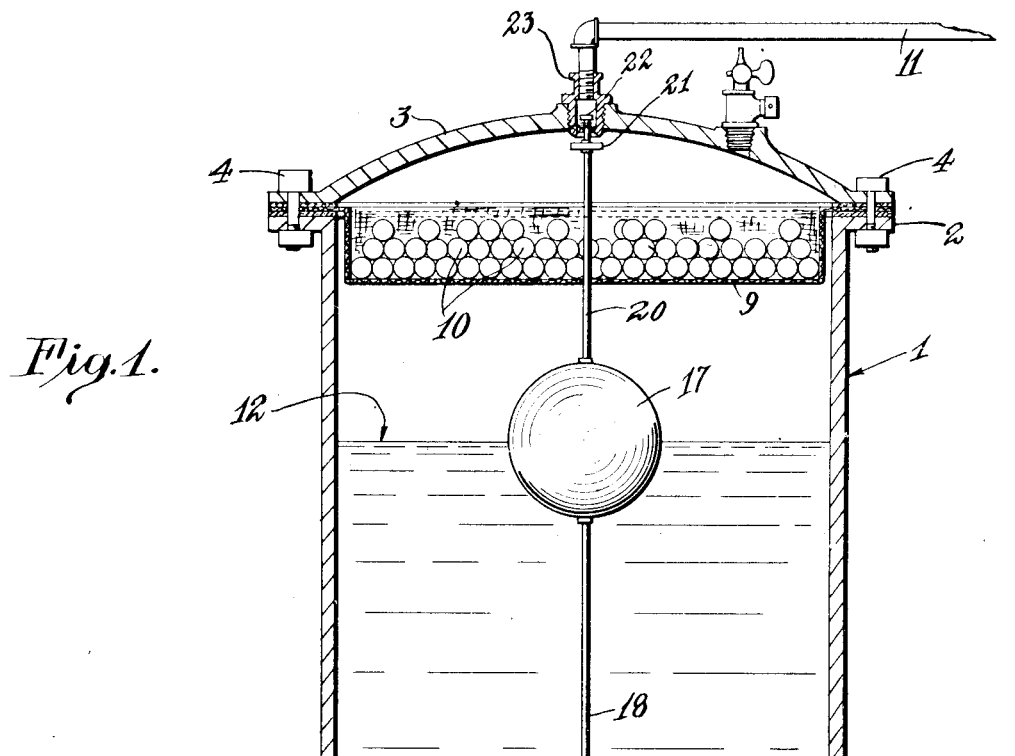
Figure 1 is a sectional side elevation of a self carbonating apparatus embodying this invention.
Figure 2:
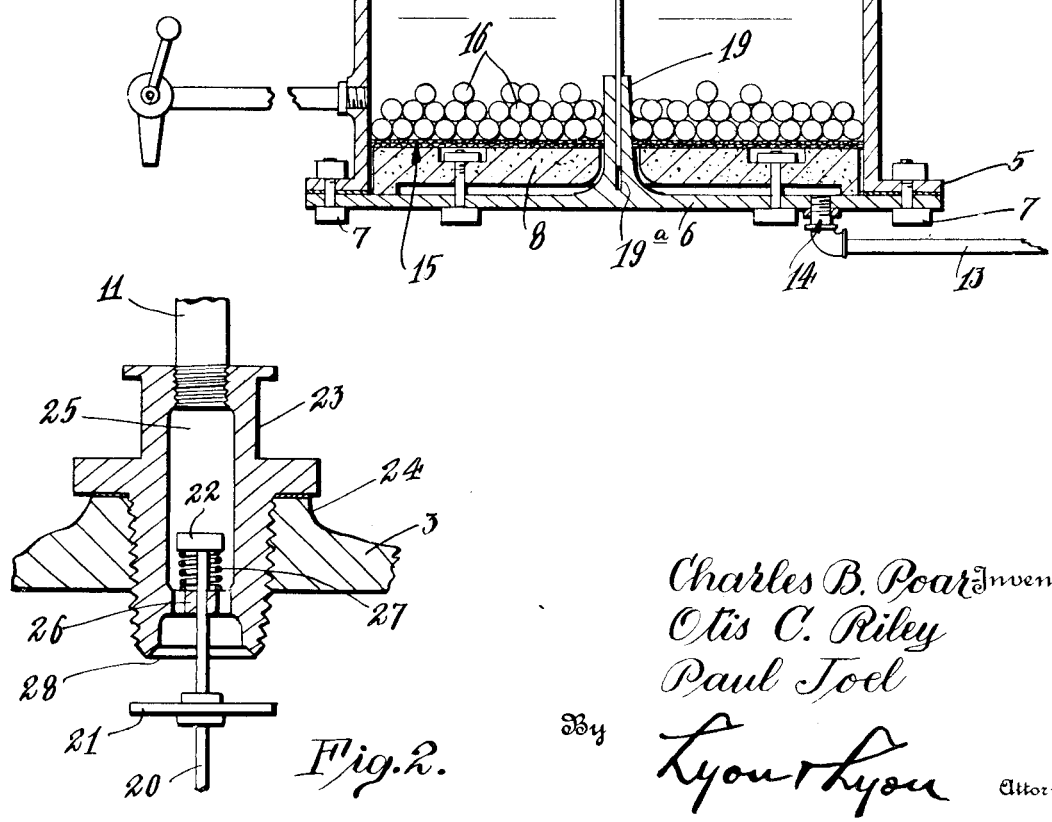
Figure 2 is an enlarged central section of the valve mechanism embodying this invention.

In the preferred embodiment of this invention illustrated in the accompanying drawings, 1 illustrates a tank which may be of any desired or preferred form and which is provided with a flange 2 at its upper end to which a flange cover 3 is secured by bolts 4. The shell of the tank 1 is also flanged outwardly at its bottom as illustrated at 5 and secured to a bottom plate 6 by means of bolts 7. A fusion stone 8 (a porous stone through which the carbon dioxide percolates and is dispersed) of any desirable construction, as is well understood in the art, is mounted at the bottom of the tank 1. A wire screen 9 is secured between the flanges of the tank 1 and cover 3 at the upper end and extends over the upper end of the tank 1. A plurality of multiplicity of fine glass balls 10 are mounted upon the screen 9 so that as the water is admitted into the tank 1 from the inlet pipe 11, the water is broken up into small drops and driven into the tank 1 into the gas present in the space above the water level as illustrated at 12. The dripping of the water through the gas space greatly increases the surface area of the water admitted into the tank and permits a greater efficiency of carbon dioxide absorption by the descending water. The carbon dioxide is admitted into the tank 1 through a pipe 13 from any desirable or suitable source, the pipe 13 being connected through the plate 6 with the interior of the tank 1 as illustrated at 14.

The carbon dioxide admitted into the tank 1 passes over the fusion stone 8 above which a second screen 15 is supported and upon which screen 15 a multiplicity of fine glass balls 16 are mounted so as to distribute the carbon dioxide and increase the surface area thereof so that the absorption between the carbon dioxide and the water will be increased during the admission of the carbon dioxide.

Means are provided for regulating the inflow of the water to the tank 1 so as to maintain a definite level of water within the tank 1, which means preferably comprise a float 17, which float 17 is secured to a float guide rod 18 at its lower end. The float guide rod 18 passes through and is guided by a float guide 19 formed on the bottom plate 6. The float guide 19 is in the nature of an upper projection formed on the plate 6, and which projection has a bore 19ª formed therein into which the rod 18 passes. The float 17 is secured to a rod 20 at its upper end, which rod 20 is secured at its upper end to a valve seat 21. The rod 20 extending through the valve seat 21 is secured at its upper end to a head 22.

The water inlet pipe 11 is secured to the cover 3 by means of a coupling member 23 which is screw-threaded at the boss 24 to the cover 3. The coupling member 23 has an interior bore 25 in which the head 22 is mounted. A web 26 is formed across the bore 25 at its lower end and has a bore through which the rod 20 extends. A compression spring 27 is mounted on the rod 20 between the head 22 and web 26. A valve seat 28 is formed at the lower end of a coupling member 23 and is adapted to be engaged by the valve head 21.

It will therefore be seen that as the level of the water drops in the tank 1, the float 17 will drop and move the head 21 away from the valve seat 28 and permit water to enter from the inlet 11. The spring 27 yieldably urges the valve head 21 towards the seat 28 so as to form a fluid tight valve closure when the level of the water in the tank 1 is at a predetermined height.

Having fully described a preferred embodiment of our invention, it is to be understood that we do not wish to be limited to the exact details herein set forth, which may obviously be varied without departing from the spirit of our invention as set forth in the appended claims.

We claim:

1. In a device of the class described, the combination of a container, means for admitting water to the top of the container, a screen mounted across the top of the container, water distributing means mounted upon the said screen for distributing the said water to cause the same to drip through the screen in drops, means for admitting gas to the bottom of the container, a screen mounted at the bottom of the container below the normal water level, and gas distributing means mounted upon the said screen and means mounted within the container for controlling the admission of water into the said container to maintain a predetermined water level in the said container.

2. In a device of the class described, the combination of a container, means for admitting water to the top of the container, valve means for controlling the admission of water to the said container, means for admitting carbon dioxide to the bottom of the container, float means for actuating the said valve to maintain a predetermined water level in the said container, guide means formed on the bottom of the said container for guiding the said float means, and carbon dioxide diffusion means mounted on the bottom of the said container and through which the said guide means extends.

3. In a device of the class described, the combination of a container, means for admitting water to the top of the container, means mounted within the container for controlling the admission of water to the said container, means for admitting gas to the said container, a fusion stone mounted at the bottom of the container, a screen mounted on the fusion stone, and a plurality of distributing members mounted on the said screen for distributing the said gas into the water within the said container.

Signed at Los Angeles this 16th day of March, 1926.

OTIS C. RILEY.
PAUL W. JOEL.
CHARLES B. POAR.